United States Patent
Williamson et al.

(10) Patent No.: US 8,230,116 B2
(45) Date of Patent: Jul. 24, 2012

(54) RESUMPTION OF EXECUTION OF A REQUESTED FUNCTION COMMAND

(75) Inventors: Matthew Murray Williamson, Palo Alto, CA (US); Christopher I. Dalton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1750 days.

(21) Appl. No.: 11/070,522

(22) Filed: Mar. 2, 2005

(65) Prior Publication Data

US 2005/0228770 A1    Oct. 13, 2005

(30) Foreign Application Priority Data

Apr. 7, 2004    (GB) .................................. 0407875.4

(51) Int. Cl.
*G06F 3/00*    (2006.01)

(52) U.S. Cl. .......................................... 710/5; 713/168

(58) Field of Classification Search ................... 713/168, 713/150, 175; 710/5
See application file for complete search history.

(56) References Cited

U.S. PATENT DOCUMENTS

| | | | |
|---|---|---|---|
| 5,621,889 A | 4/1997 | Lermuzeaux et al. | |
| 6,334,121 B1 | 12/2001 | Primeaux et al. | |
| 6,678,731 B1 * | 1/2004 | Howard et al. | 709/225 |
| 2002/0169961 A1 * | 11/2002 | Giles et al. | 713/175 |
| 2004/0243584 A1 * | 12/2004 | Wesley et al. | 707/10 |
| 2005/0154887 A1 * | 7/2005 | Birk et al. | 713/168 |

FOREIGN PATENT DOCUMENTS

| | | |
|---|---|---|
| GB | 2343026 A | 4/2000 |
| JP | 2001092783 | 4/2001 |

* cited by examiner

*Primary Examiner* — Henry Tsai
*Assistant Examiner* — Titus Wong

(57) ABSTRACT

Access to a data processor is controlled by determining if a requested function command conforms to a set of parameters, the set of parameters being derived from previously executed function commands. If the requested function command does not conform to the set of parameters the data processor is controlled to temporarily hold the execution of the requested function commands.

18 Claims, 5 Drawing Sheets

RESUMPTION OF EXECUTION OF A REQUESTED FUNCTION COMMAND

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

FIELD OF THE INVENTION

The present invention relates to the control of access to one or more computers.

BACKGROUND OF THE INVENTION

Almost any computer system is open to attack either by malicious software, such as viruses, or by unauthorised access to the system by an individual with malicious intent. In both instances, the primary subject of the malicious attack is to steal, modify or destroy important data held on the computer system. The costs associated with damage to the operating system or other software is negligible when compared with the value of the information that a person has laboured to produce. Computer systems use various access control mechanisms to allow legitimate users to access certain resources and prevent them from accessing others. Normally, the user is given sufficient resources, also known as privileges or permissions, to accomplish all the jobs or tasks that they are likely to do. Two popular approaches to controlling access to data and resources are application-centric and data-centric approaches.

An application-centric approach controls access by defining a set of actions that individual software applications running on the computer system are allowed to perform. For example, a word processing application may be prevented from launching an email program or establishing an internet connection. It will of course be appreciated that individual users, or groups of users, each have their own defined sets of permissions for the various software applications which they are allowed access to. The data-centric approach controls access to the computer system by defining those applications that are allowed to access certain data types. For example, a permission may be defined to restrict access to text files to a particular word processing application only, and to prevent access to those text files by other software applications, such as a web browser, that is nonetheless capable of reading such text files.

A primary disadvantage of both the application-centric and data-centric approaches is that the defined permissions result in an access control system that is entirely binary in its response. That is to say, if an access request falls within the scope of the defined permissions then access is granted. If the request is not, then access is denied.

In itself this binary nature is not a problem but it does lead to a particular use of the access control system that is not very efficient. Individual users generally only perform a relatively small number of tasks on a daily basis. However, should the set of permissions for that user be restricted to only those tasks the user is prevented from performing any other task, regardless of the nature of that task. For example, a user may wish to perform a certain job on a regular, but infrequent, basis, such as generating a quarterly financial report. If the user's original set of permissions does not allow them to perform this operation, it is likely that the user will request that the set of permissions is expanded accordingly. However, on a daily basis the user does not use those permissions required to generate the financial report. In a similar vein, a user's set of permissions may be expanded to allow a one-off activity to be performed, but human nature often means that after the activity has been completed the permissions are not subsequently removed. Consequently, it is often the case that a significant number of the permissions within a user's defined set of permissions are not used on a regular basis and consequently can be used by either a hacker or a piece of malicious software without the corresponding access being denied.

SUMMARY OF THE INVENTION

According to a first aspect of the present invention there is provided a method of controlling access to a dataprocessor, the data processor being arranged to execute a plurality of requested function commands, the method comprising: determining if a requested function command conforms to a set of parameters, the set of parameters being derived from previously executed function commands; in response to determining that the requested function command does not conform to the set of parameters, controlling the data processor to halt the execution of the requested function command; and controlling the data processor to subsequently resume execution of the requested function command in response to one or more resumption conditions being satisfied.

Preferably, the set of parameters is automatically updated. Additionally or alternatively, the set of parameters is defined in terms of data type and software application to which access by the data processor is permitted.

Preferably, in response to a requested function command being halted, the data processor may generate a user prompt for the input of a user authorisation, the execution of the halted function command being resumed in response to the input of the user authorisation.

Additionally or alternatively, the execution of a halted function command may be resumed after the expiry of a given time period. Consequently, a user may choose between entering an authorisation or allowing a time period to automatically expire.

Additionally or alternatively, the number of requested function commands that do not conform to the set of parameters in a predetermined period of time may be determined and if the number exceeds a threshold value then a user notification may be generated.

Additionally or alternatively, the maximum number of halted function commands whose execution is resumed in a given period of time may be restricted.

Additionally or alternatively, requested function commands that do not conform to the set of parameters may be stored, for example in a log file.

According to a second aspect of the present invention there is provided a data processor arranged to execute requested function commands, the data processor comprising: a function command monitor arranged to receive a requested function command and to determine if the function command conforms to a set of parameters, the set of parameters being derived from previously executed function commands, and, if the function command does not conform to the set of parameters, to generate an execution halt command; and a function command controller configured to halt the execution of the requested function command in response to receiving an execution halt command and to resume the execution of the requested function command in response to one or more resumption conditions being satisfied.

Additionally, the function command monitoring means may be further arranged to update the set of parameters in accordance with the received requested function command.

The set of parameters may be defined in terms of data type and software application to which access by the data processor is permitted.

Additionally or alternatively, the function command control means may be further arranged to generate a request for a user input and in response to receiving the user input to control the data processor such that the execution of the delayed function command is resumed.

Additionally or alternatively, the function command control means may be further arranged to control the data processor such that the execution of the delayed function command is resumed after the expiry of a given period of time. In addition, the given period of time may be of variable duration.

The function command monitoring means may be arranged to determine the total number of requested function commands that do not conform to the set of parameters in a given time period and, if the total number exceeds a threshold value, to generate a first notification signal.

Additionally or alternatively, the function command control means may include storage means in which the delayed function commands are stored, the command control means being arranged to restrict the number of stored function commands that are retrieved from the storage means in a given time period. Additionally, the function command control means may be further arranged to generate a second notification signal when the number of delayed function commands stored in the storage means exceeds a threshold value.

According to a third aspect of the present invention there is provided a computer program product comprising a plurality of computer readable instructions that when run by a computer causes the computer to perform a method according to any one of claims 1 to 7.

Additionally, the computer program product may be embodied in a data carrier or alternatively is embodied in an electrically transmissible form.

BRIEF DESCRIPTION OF THE DRAWINGS

Embodiments of the present invention are described below, by way of illustrative example only, with reference to the accompanying figures, of which.

DETAILED DESCRIPTION OF THE PREFERRED EMBODIMENT

Figure 1:
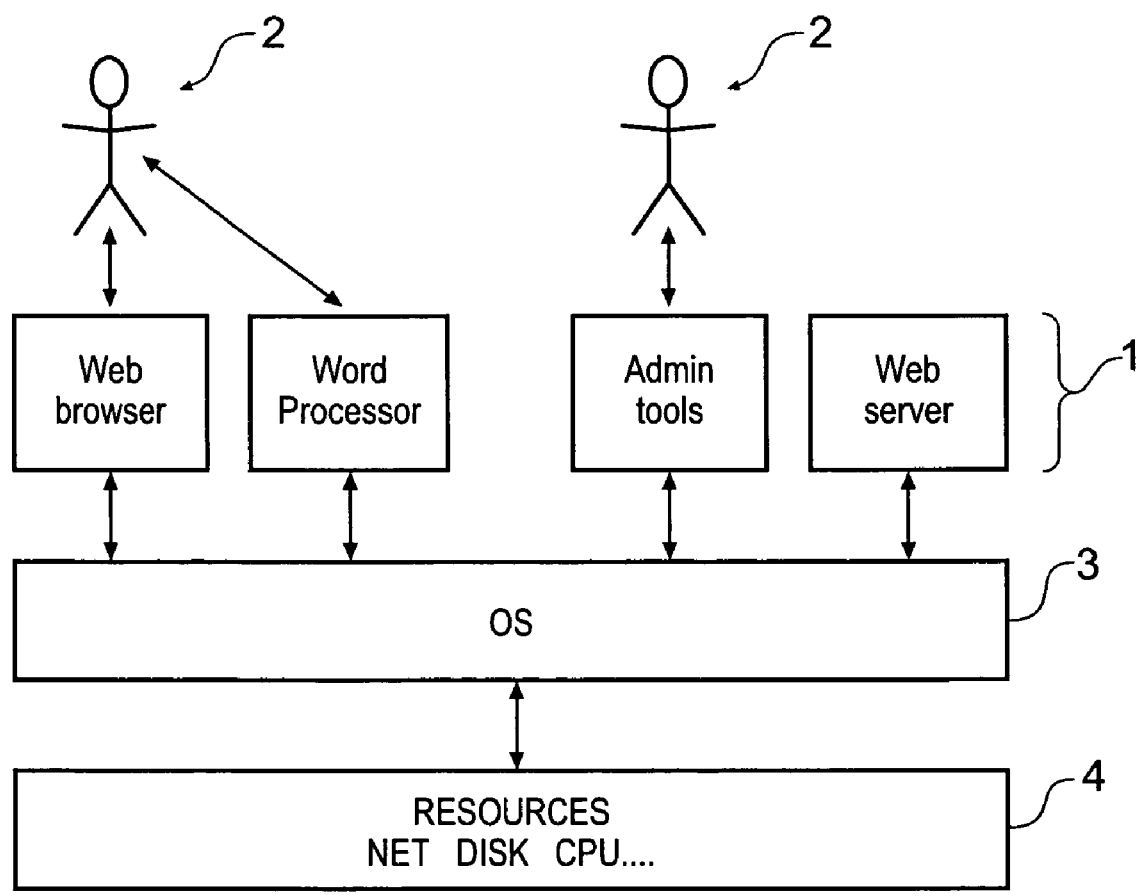
FIG. 1 schematically illustrates the basic architecture of a computer system.

With reference to FIG. 1, the majority of computer systems can be characterised as comprising: an application layer 1 comprising one or more applications, such as web browsers, word processors, administration tools (e.g. anti-virus software) and web servers, that provide an interface between individual users 2 and the rest of the computer system or automatically access the computer system themselves; an operating system (OS) 3; and a resource layer 4 including hardware such as modems, processors and memory devices.

Generally speaking, the control and management of the file system and resources is performed by the operating system. This is a piece of resident software on the computer system and provides an interface between the relatively high level commands and requests issued by the users and applications and the hardware specific commands required by the resources and file system to perform those requests. A mechanism by which this occurs is for each request from a user or application, the operating system issues one or more system calls. A system call is a low level command to which the system resources are directly responsive. Consequently, it is within the operating system, at the system call level that the access control process of the present invention is preferably implemented.

Figure 2:
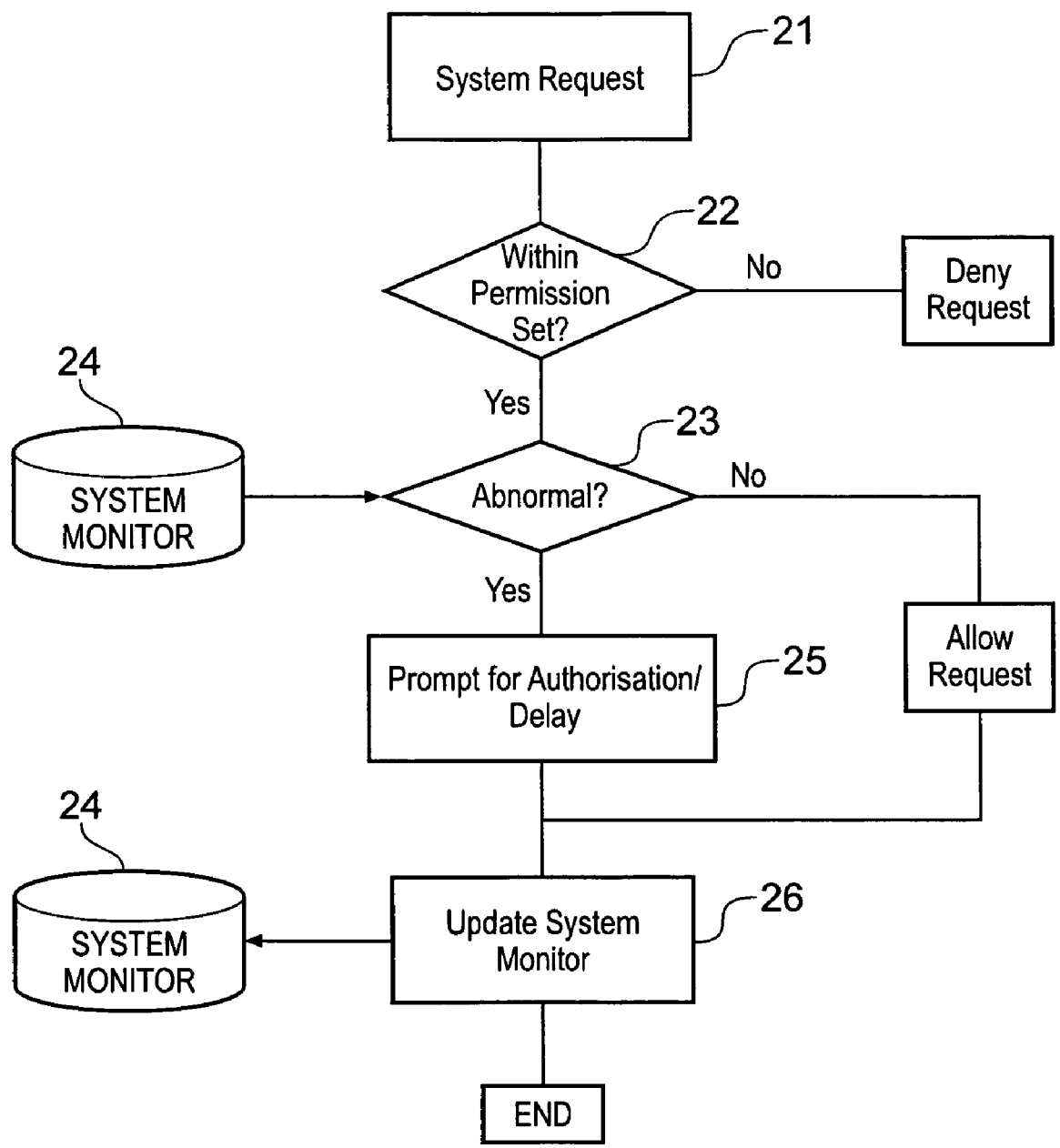
FIG. 2 schematically illustrates a mode of operation of a computer system according to an embodiment of the present invention.

A schematic illustration in the form of a flow chart is illustrated in FIG. 2 that represents a mode of operation of an access control system operating in accordance with an embodiment of the present invention. The process is instigated by a system request 21 being issued by an application, either directly in response to a user operation or as part of one or more functions automatically executed by the application in question. An example of such a request would be to open a particular data file. The request is next compared to a defined permission set, step 22, to determine if the user or application has the required permissions to access the requested data file. This permission set is predefined and definite, in the sense that a system request will either fall within the permission set or not. If the issued system request 21 does not fall within the predefined set of permissions, the request is denied, with a suitable warning or notification being preferably issued to the user. The set of permissions, or privileges, is preferably defined both in terms of the particular data items that an application can access and also the particular applications that a user is allowed to use. With respect to the second restriction, it will be appreciated that, as previously mentioned, an application may be responsive to both a direct command from a human operator or may be responsive to some other automatic process. An example of the latter occurrence would be the use of a internet dial up application to establish a connection with an internet server in response to an anti-virus software application running an automatic scheduled virus update procedure. In this instance, the operation of the dialup application occurs not in response to direct user demand, but in response to a request from the anti-virus software. Consequently, a "user" can be both a human operator and another software application. The set of defined privileges may additionally be defined in terms of particular operations on data items that individual applications are allowed to perform, for example an application may have permission to read a particular data file but not to edit or delete it. The data files may be defined in terms of their own characteristics, for example all PDF files may be accessed by an identified PDF reader, or alternatively, the data files may be characterised in terms of their location, for example all data files of any type within an individual users home directory may be fully accessible by that user. This first stage, as explained above, follows known prior art techniques. However, in embodiments of the present invention additional steps are taken.

If the system request does comply with the defined permission set it is subsequently determined, at step 23, whether or not the request is deemed to be abnormal or unusual. To determine what is abnormal or unusual a system monitor 24 is provided. The system monitor is capable of learning the normal activity profile of a user. The learning process may occur over a fixed initial period during which the user is prompted after every system request to indicate whether this is a usual or unusual activity. However, a preferred mode of learning involves maintaining a continuously updated record of each user request and determining whether or not they are abnormal or unusual from various characteristics, such as the frequency with which a user makes a request, the data types most often accessed by the user, the time of day, and other such attributes. The precise learning model of the system monitor is not particularly germane to the present invention and is therefore not discussed in any further detail herein.

If the system request is considered to be a normal request by the system monitor, the request is allowed and the desired operation of the computer system proceeds as expected. On the other hand, if the system monitor 24 determines that the system request is abnormal any one or combination of a number of conditions are applied that have to be satisfied for the execution of the system request to be completed. These conditions are referred to herein as benign responses. In the context of this specification, a benign response is one that impedes a suspected unauthorised operation but ultimately does not completely prevent it. An advantage of such benign responses is that they can be set to occur automatically safe in the knowledge that even if the response turns out to be a false alarm there are no significant or lasting detrimental effects. This is in comparison to prior art systems in which the responses tend to be much more drastic, e.g. the termination of a communication session. Possible conditions, as represented at step 25, include prompting the user for a password. The password may be the user's conventional computer access password as used to initially log in to the computer system, or may be a further password that is used only when an abnormal system request is detected. It will be appreciated that other possible permutations of password authorisation may be applied, for example requesting a different predetermined password depending upon the level of "abnormality" determined by the system monitor or, for example, subsequent passwords may be requested depending upon the frequency of abnormal system requests being made over a given period of time. A further alternative may be that as part of the prompt for authorisation, a newly created password is presented to the user which must be entered in response to the prompt. Preferably, the password is presented to the user as an image that whilst possible for a human operator to distinguish, is extremely difficult for a machine to detect. This approach, known generally as a Reverse Turing Test, is designed to ensure the intervention of a human is required and to help prevent automatic password generating algorithms bypassing a predetermined password system. Whilst not preventing an abnormal system request, by requesting a further password or other form of authorisation, a malicious user may be prevented or delayed from gaining access to the computer system, whereas the genuine authorised user is merely slightly inconvenienced.

As an alternative, or in conjunction with asking for a password when an abnormal system request is made, other conditions, or benign responses, may be applied. For example, a time delay may be applied before the system request is actioned. For example, the user may be requested to wait 30 seconds before the system request is actioned. A variation to this may be that user is presented with the choice of allowing the delay to expire naturally, or entering a password as previously discussed to circumvent the delay. Again, whilst this does not prevent a determined malicious user from gaining access to the computer system, in the case that the malicious user is in fact an automated virus, or other such similar software, the imposed delay may well be sufficient to hinder the virus from performing its design operation as the automated nature of virus software may not be capable of dealing with an unexpected time delay. In a further variation, the imposed time delay may be progressively increased for each subsequent abnormal system request in any given period of time.

On completion of the re-authorisation process 25 and or completion of the system request itself, a "learning" process 26 is performed, in which the system monitor 24 is updated in an appropriate manner to reflect any changes in a users pattern or operation of the computer system.

Figure 3:
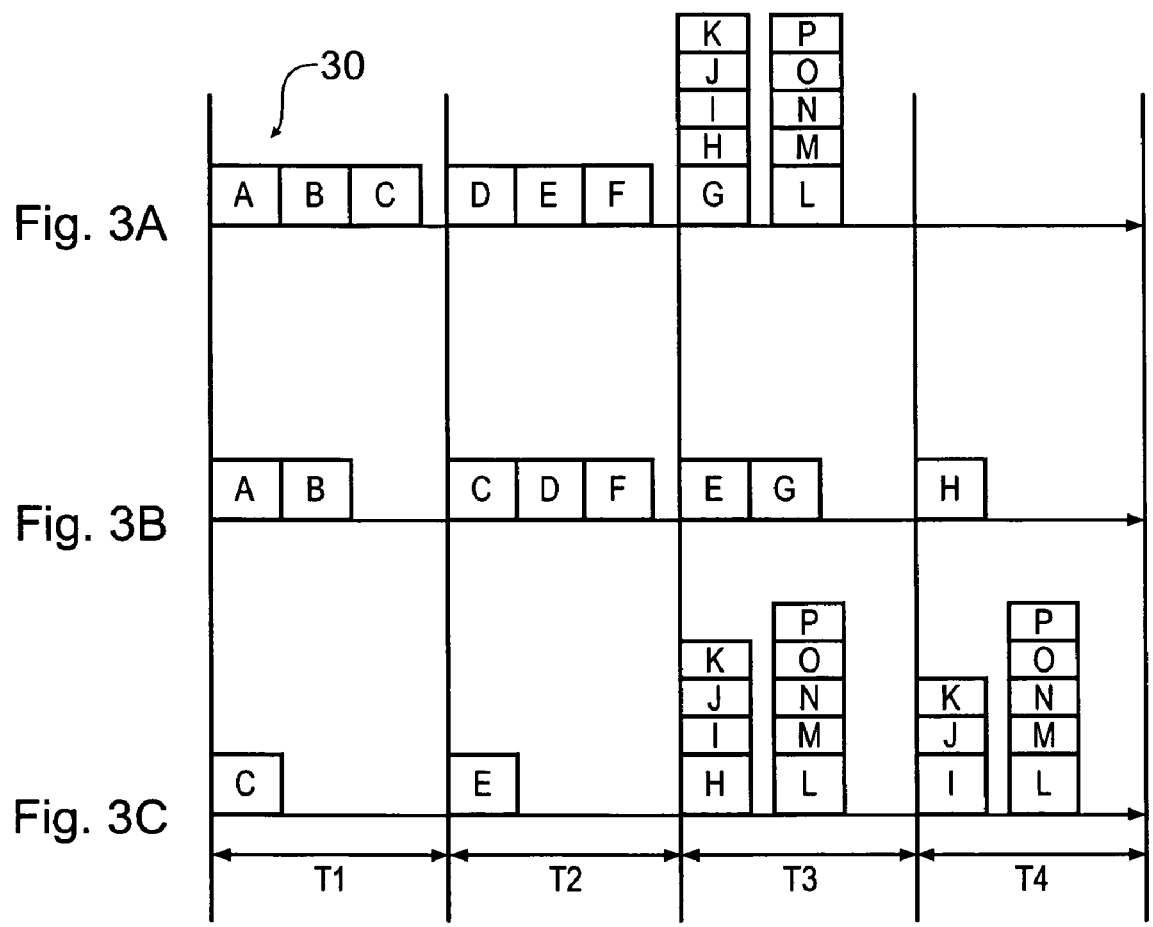
FIG. 3a-3c schematically illustrates a method of managing abnormal system requests according to an embodiment of the present invention.

As touched upon above, the number of abnormal requests made in any given period of time may be taken into consideration when applying an appropriate response. An illustration of how this may be achieved is shown schematically in FIGS. 3a to 3c. FIG. 3a schematically illustrates the system requests issued by a user or application during for substantially equal time periods T1 to T4. In the first time period T1, three system requests 30 are issued, referenced A to C. In the example shown, system request C is considered to be an abnormal request. FIG. 3b illustrates those system requests that are processed within any given time period and it will be seen that during the first time period T1 system requests A and B, which are considered normal requests, are processed immediately. FIG. 3c schematically represents a buffer in which the abnormal requests are stored for a single predetermined time period. Hence, in time period T1 the abnormal system request C is stored in the buffer. In the subsequent time period T2 three further system requests, D, E and F are issued, with system request E being considered an abnormal request. Consequently request E is placed in the buffer, shown in FIG. 3c, whilst request D and F are processed immediately, together with request C which has now been retrieved from the buffer. In the example shown, only a single abnormal request per time period is retrieved from the buffer illustrated by FIG. 3c. At the next time period, T3, it will be seen from FIG. 3a that a large number of system requests have been issued, only one of which G is considered to be a normal request. The large number of abnormal system requests H to P may be issued due to the actions of a malicious user or malicious piece of software such as a virus. Consequently, the large number of abnormal requests H to P are placed in the buffer, with only the abnormal request E from the previous time period T2 and the normal request G being processed in the third time period T3. During the fourth time period, T4, no new system requests are issued and the single abnormal request H is retrieved from the buffer and processed, with the remaining abnormal requests I to P remaining in the buffer.

The system may be arranged to provide a warning to an appropriate user if the number of abnormal requests in the buffer exceeds the predetermined number, as this would indicate attempted access to the computer system by a malicious user or piece of malicious software. Even if no such warning was given, or no action taken in response to the warning, the restricted number of abnormal system requests that are processed from the buffer during each time period is likely to significantly hamper the operations of a malicious user, and in particular hamper the operation of a piece of malicious software.

As mentioned previously, the most appropriate place to implement embodiments of the present invention is in the kernel of the computer operating system. The basic implementation in respect of a UNIX base computer system is described below by way of illustrative example only.

The Unix OS has two modes—user mode and kernel mode. Applications run as tasks in user mode. Tasks on the Unix operating system are represented by the process (or thread) abstraction. A running application may have one of more tasks associated with it.

The operating system runs in kernel mode. Tasks running in user mode are unprivileged and have no direct access to the system resources. The operating system running in kernel mode is privileged and can access system resources directly. The unprivileged application tasks get access to system resources (such as files or network connections) by the system call, also referred to herein as function requests, mechanism. To access a particular resource a task makes a system call. For example, to read from a file the task makes the "read" system call, to run another application the task calls the fork system call (explained further below) followed by the exec system call. These system calls cause the operating system kernel to carry out the corresponding system resource operations on behalf of the calling process. To implement embodiments of the present invention it is possible to add checks at the point where an application makes a system call so that a check can be made whether the requested operation fits within its normal use profile. An example of the operation of a Unix operating system in accordance with embodiments of the present invention is illustrated in FIG. 4.

Figure 4:
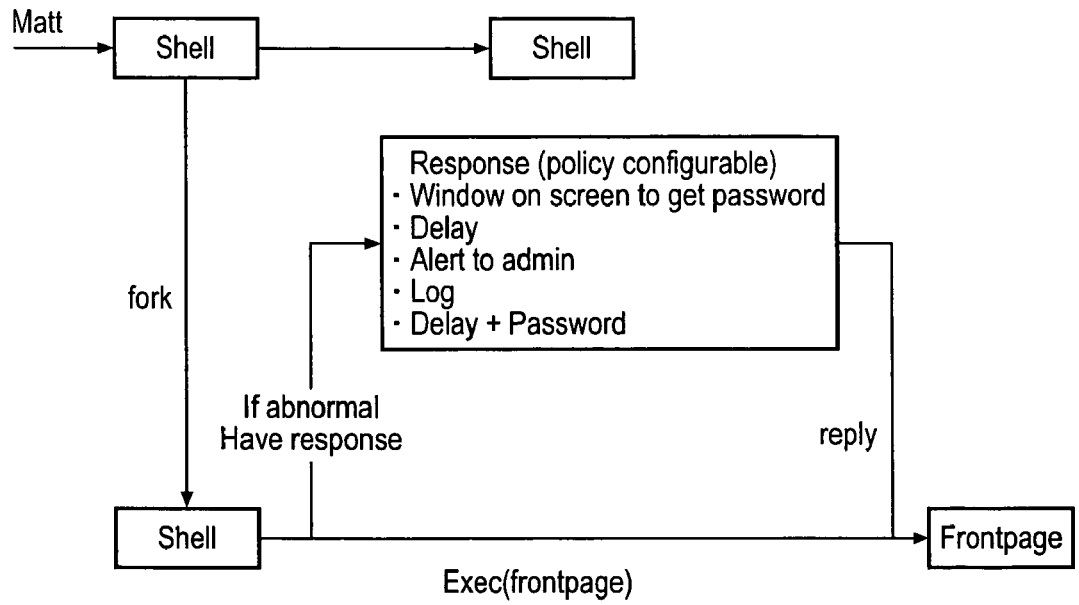
FIGS. 4 and 5 schematically illustrates a process execution flow within a Unix system according to embodiments of the present invention.

FIG. 4 schematically shows a segment within the flow of execution of the operating system, with individual processes shown as boxes and system calls as lines. Matt is a computer user and is allowed to use Frontpage for editing html (web) pages, but does not usually do so. When he attempts to run Frontpage, the first system call is a fork. To process this command, the kernel creates an identical copy of the current process. The second call is an exec. To process this command, the kernel will copy the binary for Frontpage into the second process, so that Frontpage can run. According to embodiments of the present invention, the fork will succeed, but when the exec is attempted, the system will notice that Matt does not unusually run Frontpage, and jump out of processing the exec command, to running the response code. This will contain some policy configurable responses, for example popping up a window to ask for a password, logging, sending a message to an admin (alert), delaying, or delaying and asking for a password. Depending on the result of the response, the system call that is waiting (exec in this case) will be allowed.

Figure 5:
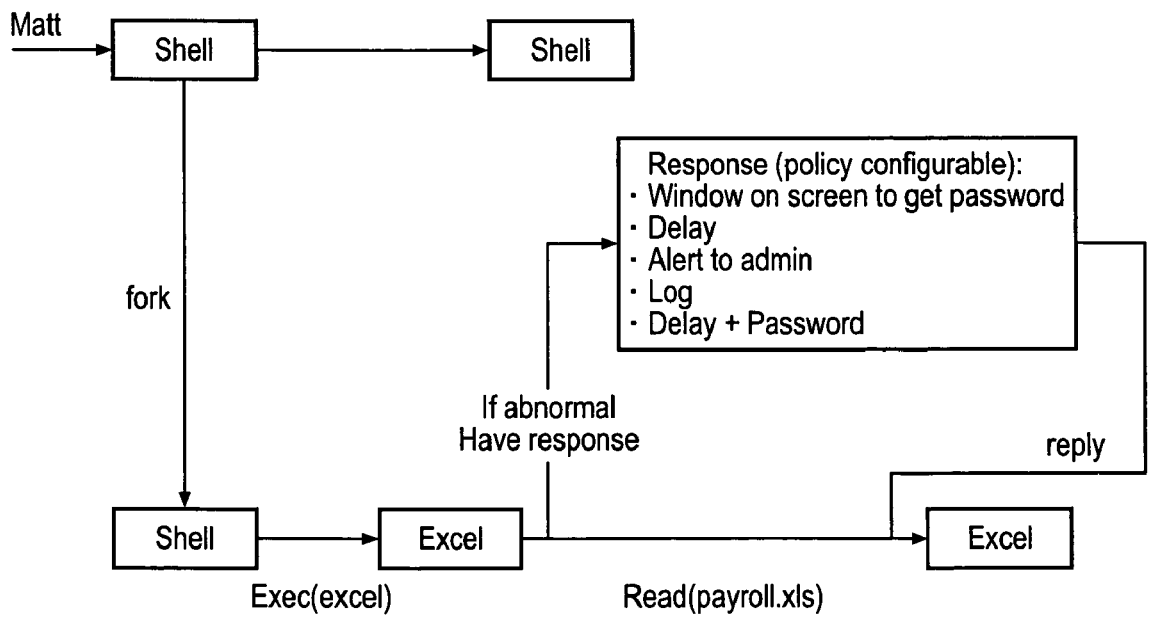

A further example is illustrated in a similar manner in FIG. 5. Matt usually uses Excel, usually using it to read and write x1 files in his home directory. At the end of each month he edits the payroll spreadsheet in a different directory. Matt then attempts to read the payroll spreadsheet in the second week of the month. The process forks successfully and the exec system call is allowed, (because Matt usually uses excel). However, when he tries to open the payroll file, the system intercepts the "read" system call, i.e. read (payroll.xls), and jumps out to run the response. Depending on the reply from the response, the read will either return a handle to the file, or return an error. Thus there is a need to examine calls (and arguments) to exec, read and write when controlling which applications a user uses on what data. This is in contrast to, and is advantageous over, other known approaches that need to examine all system calls. As embodiments of the present invention examine significantly fewer system calls, they provide more efficient implementations.

Processes have an attribute identifying the owner associated with them (UID). For interactive applications the owner will typically be the user who is currently running the application. Server type applications are often run as the root user. The root user is a special user on Unix and has access to all the system resources. Typically, administration of the system is done using the root account. However, often server applications are run as root since they may need to carry out certain privileged operations.

For the purposes of embodiments of the present invention it is important that we can distinguish between root when running as user doing administration versus root running a server program. The root server permission set is preferably more restrictive than the root administrator set. One mechanism for making this distinction according to embodiments of the present invention is described below. Each process has an additional attribute associated with it via its 'task_struct' data structure. The 'task_struct' is a record of information about a particular process on the system and is held in the kernel. This attribute is simply 1 or 0. Processes that belong to an admin user of the system have this bit set to 1. All other processes on the system have this bit set to 0. When deciding which permission set/behaviour to apply to a particular process this extra attribute can be taken into account.

In the kernel startup code (pre-user space operation) the attribute for all tasks is set to 0. The bit is then turned on within the INIT kernel_thread prior to it invoking the INIT user space program. INIT is the first user space process and all other user space processes are forked/exec-ed from it. Under Unix, processes that are subsequently forked/exec-ed by INIT are controlled by the /etc/inittab file. This file is used to specify which processes should have the bit unset and which processes should have it left set.

It is important to note that NO method is provided to set the attribute to 1 after it has been set to 0 from userspace. It is only possible to unset the attribute or query its value from user space. The attribute value is inherited and its value preserved through fork/exec.

So, with this new attribute the INIT program can launch new processes that are either admin processes or not by either unsetting or not unsetting the attribute. For example, processes, such as a web server running as root will have the attribute unset, marking it as a server process. Even though a service may be running as root they cannot modify the attribute, as there is simply no mechanism to do this from user space. On the other hand, processes launched by a user from certain physical terminals will have the attribute marked as set, marking all processes launched from those terminals as a user doing administration. This allows it to determine whether somebody running as root entered the system via a legitimate route (such as logging on via the system console) or via a compromised web server, say.

Figure 6:
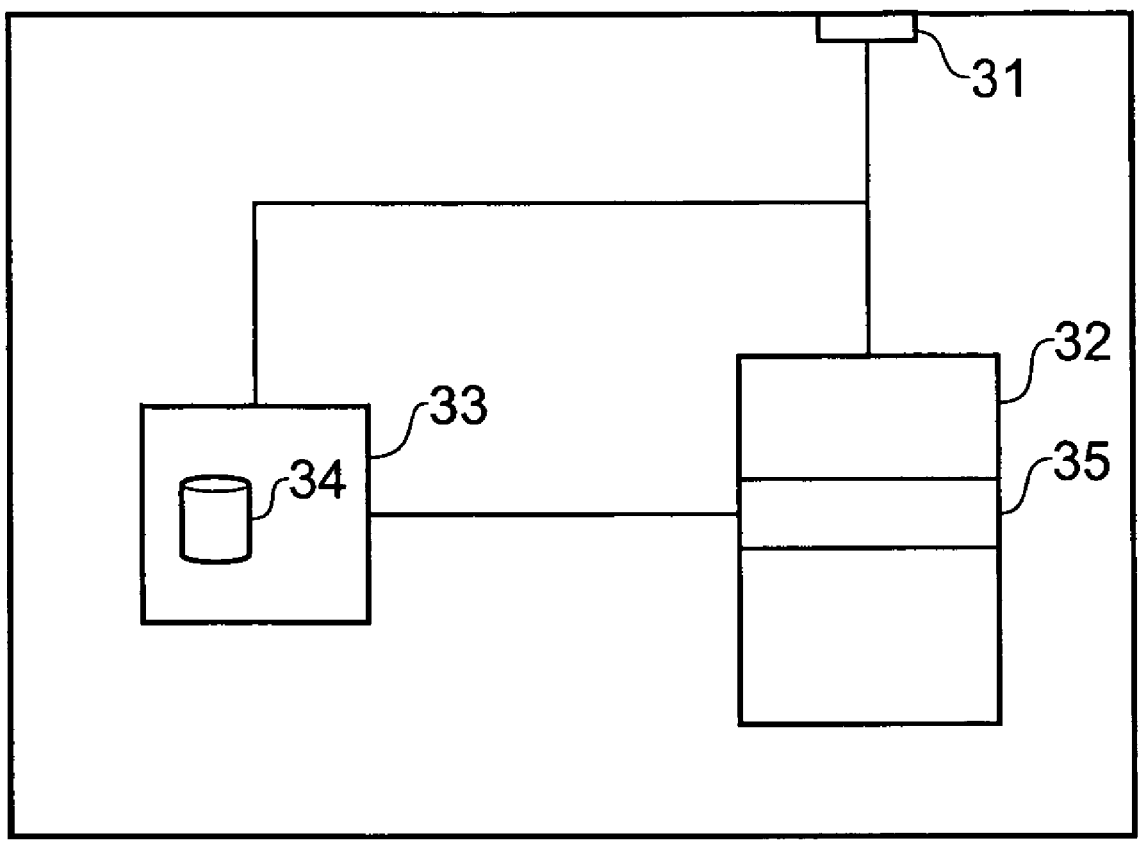
FIG. 6 is a schematic representation of a data processor in accordance with embodiments of the present invention.

A schematic representation of a dataprocessor configured in accordance with embodiments of the present invention is shown in FIG. 6. Requested function commands received at an input 31 of the dataprocessor are distributed to a main processing unit 32, responsible for the execution of the function command, and to a function command monitor 33. The function command monitor 33 determines if the requested function command conforms to a set of parameters, i.e. if the function command is abnormal or not. The set of parameters may be stored in a memory device 34 within the function command monitor 33, as shown in FIG. 6, or may be stored elsewhere within the dataprocessor or remotely from the dataprocessor.

The function command monitor 33 is coupled to a function command controller 35, represented in FIG. 6 as embedded within the main processing unit 32. The function command controller 35 is configured to halt the execution of a function command by the main processing unit 32 in response to receiving a control signal from the function command monitor 33. The function command controller is also configured to allow the resumption by the main processing unit 32 of the function command in response to one or more resumption conditions being satisfied, as previously discussed herein. The generation of user prompts and the management of time delays is also controlled by the function command controller.

The invention claimed is:

1. A method of controlling access to a data processor, the data processor being arranged to execute a plurality of requested function commands, the method comprising:
   determining from previously executed function commands a set of parameters that reflect a pattern or operation of the data processor by a user;
   determining whether a requested function command conforms to a permission set of the user;
   in response to the requested function command being determined to conform to the permission set, using the set of parameters to determine whether the requested function command conforms with the pattern of operation of the data processor;
   in response to determining that the requested function command does not conform to the pattern of operation of the data processor, controlling the data processor to halt the execution of the requested function command; and
   controlling the data processor to subsequently resume execution of the requested function command in response to one or more resumption conditions being satisfied.

2. The method according to claim 1, further comprising updating the set of parameters based on the requested function command resumed.

3. The method according to claim 1, wherein the set of parameters is defined in terms of data type and software application to which access by the data processor is permitted.

4. The method according to claim 1, wherein a resumption condition is satisfied by the input of a user authorization, the data processor generating a user prompt for the authorization in response to the requested function command being halted.

5. The method according to claim 4, wherein the user authorization is included in the user prompt in a non-machine readable manner.

6. The method according to claim 1, wherein a resumption condition is satisfied by the expiry of a given time period.

7. The method according to claim 1, wherein the number of requested function commands that do not conform to the set of parameters in a predetermined period of time is determined and if the number exceeds a threshold value a user notification is generated.

8. The method according to claim 1, wherein the maximum number of halted function commands whose execution is resumed in a given period of time is restricted.

9. A data processor arranged to execute requested function commands, the data processor comprising:
   a function command monitor arranged to:
      determine from previously executed function commands a set of parameters that reflect a pattern or operation of the data processor by a user;
      receive a requested function command;
      determine whether the requested function command conforms to a permission set of the user;
      in response to the requested function command conforming to the permission set, determine whether the requested function command conforms to the set of parameters; and
      if the function command does not conform to the set of parameters, generate an execution halt command; and
   a function command controller configured to halt the execution of the requested function command in response to receiving said execution halt command and to resume the execution of the requested function command in response to one or more resumption conditions being satisfied.

10. The data processor according to claim 9, wherein the function command monitor is further arranged to update the set of parameters in accordance with the requested function command upon resumption of the requested function command.

11. The data processor according to claim 9, wherein the set of parameters is defined in terms of data type and software application to which access by the data processor is permitted.

12. The data processor according to claim 9, wherein the function command controller means is arranged to generate a request for a user input and in response to receiving the user input to control the data processor such that the execution of the delayed function command is resumed.

13. The data processor according to claim 9, wherein the function command controller is arranged to control the data processor such that the execution of the delayed function command is resumed after the expiry of a given period of time.

14. The data processor according to claim 13, wherein the given period of time is of variable duration.

15. The data processor according to claim 9, wherein the function command monitor is arranged to determine the total number of requested function commands that do not conform to the set of parameters in a given time period and, if the total number exceeds a threshold value, to generate a first notification signal.

16. The data processor according to claim 9, wherein the function command controller includes a data storage device in which the delayed function commands are stored, the command controller being arranged to restrict the number of stored function commands that are retrieved from the data storage device in a given time period.

17. The data processor according to claim 16, wherein the function command controller is further arranged to generate a second notification signal when the number of delayed function commands stored in the data storage device exceeds a threshold value.

18. A computer storage medium comprising a plurality of computer readable instructions that when run by a computer causes the computer to perform the method according to claim 1, wherein the computer storage medium is a physical structure.

* * * * *